(12) United States Patent
Ferrero et al.

(10) Patent No.: US 11,788,578 B2
(45) Date of Patent: Oct. 17, 2023

(54) WHEEL HUB ASSEMBLY WITH OPTIMIZED RACEWAYS

(71) Applicant: AKTIEBOLAGET SKF, Gothenburg (SE)

(72) Inventors: Alessandro Ferrero, Turin (IT); Fabio Bogliacino, Cortemilia (IT); Maurizio Bertola, Turin (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/711,190

(22) Filed: Apr. 1, 2022

(65) Prior Publication Data
US 2022/0324255 A1    Oct. 13, 2022

(30) Foreign Application Priority Data
Apr. 12, 2021  (IT) .......................... 102021000008999

(51) Int. Cl.
*F16C 33/58* (2006.01)
*F16C 19/18* (2006.01)
*B60B 27/00* (2006.01)

(52) U.S. Cl.
CPC ........ *F16C 33/585* (2013.01); *B60B 27/0005* (2013.01); *B60B 27/0094* (2013.01); *F16C 19/186* (2013.01); *F16C 2326/02* (2013.01)

(58) Field of Classification Search
CPC .... F16C 19/166; F16C 19/186; F16C 33/585; F16C 2240/76; F16C 2326/02; B60B 27/0005; B60B 27/0094; B60B 2380/12; B60B 2380/73–774
See application file for complete search history.

(56) References Cited

U.S. PATENT DOCUMENTS

| | | | | |
|---|---|---|---|---|
| 2,316,449 A | * | 4/1943 | Parker | F16C 19/166 384/516 |
| 2,623,796 A | * | 12/1952 | Frenkel | F16C 19/163 384/450 |
| 4,398,778 A | * | 8/1983 | Kraus | F16H 15/38 384/615 |
| 5,427,458 A | * | 6/1995 | Sanchez | F16C 19/38 384/450 |

(Continued)

OTHER PUBLICATIONS

Search Report for corresponding Italian Patent Application No. 102021000008999 dated Dec. 10, 2021.

*Primary Examiner* — Alan B Waits
(74) *Attorney, Agent, or Firm* — Reed Smith LLP

(57) ABSTRACT

A bearing unit for a wheel hub assembly for motor vehicles, having a first raceway which is a radially outer and axially outer raceway and a second raceway which is a radially outer and axially inner raceway, a third raceway which is a radially inner and axially outer raceway and a fourth raceway which is a radially inner and axially inner raceway; an axially outer row and an axially inner row of rolling bodied, interposed, respectively, between the first raceway and the third raceway and between the second raceway and the fourth raceway; at least one raceway is provided with a first raceway portion and a second raceway portion, the raceway portions being tangential to the rolling body of the row of rolling bodies at two different contact angles the first contact angle of the first raceway being smaller than the second contact angle of the second raceway portion.

18 Claims, 4 Drawing Sheets

(56) References Cited

U.S. PATENT DOCUMENTS

| | | | |
|---|---|---|---|
| 2009/0034895 A1* | 2/2009 | Zlipko | F16C 33/585 |
| | | | 384/513 |
| 2009/0129713 A1* | 5/2009 | Hattori | F16C 19/166 |
| | | | 384/514 |
| 2011/0235958 A1* | 9/2011 | Norimatsu | B60B 27/0084 |
| | | | 384/544 |

* cited by examiner

US 11,788,578 B2

WHEEL HUB ASSEMBLY WITH OPTIMIZED RACEWAYS

CROSS-REFERENCE TO RELATED APPLICATIONS

This application is based on and claims priority to Italian Patent Application No. 102021000008999 filed on Apr. 12, 2021, under 35 U.S.C. § 119, the disclosure of which is incorporated by reference herein.

FIELD

The present disclosure relates a wheel hub assembly provided with a bearing unit, having a pair of rolling bearings, for rotatably supporting a wheel of a vehicle mounted on a suspension system.

BACKGROUND

Wheel hub assemblies are typically provided with a bearing unit for rotatably supporting a wheel of a vehicle on a suspension system. The bearing unit often include a pair of rolling bearings, but different configurations of a bearing unit are possible.

BRIEF DESCRIPTION OF THE DRAWINGS

The attached drawings illustrate various non-limiting exemplary embodiments in accordance with this disclosure, in which.

DETAILED DESCRIPTION

Figure 1:
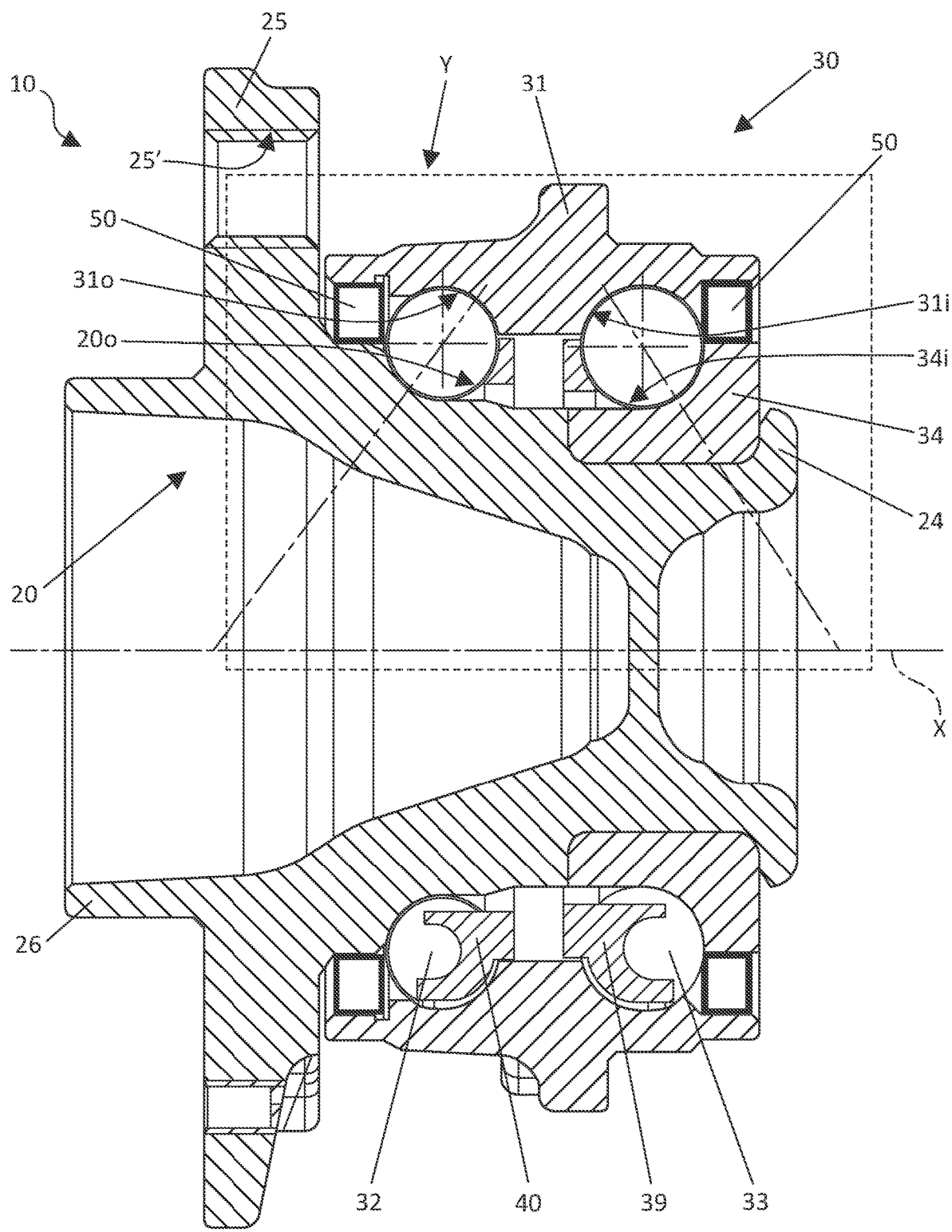
FIG. 1 is a cross-section through a wheel hub assembly provided with a bearing unit in accordance with this disclosure.

Embodiments of this disclosure may be applied to all generations of wheel hub assemblies. In particular, such applications include both the case where the outer ring of the bearings is rotatable, while the inner rings of the bearing are fixed, and the opposite case where the inner rings rotate and the outer ring is fixed.

A wheel hub assembly is provided with a bearing unit for rotatably supporting a wheel of a vehicle on a suspension system. The bearing unit includes a pair of rolling bearings, but embodiments of this disclosure may be applied to different configurations of the bearing unit. In particular, the present disclosure relates to bearing units designed with particular raceways, so that a wheel hub assembly may operate with low losses due to friction and with an optimum performance.

A wheel hub assembly in accordance with this disclosure comprises a rotatable hub provided with a flange for engaging a rotating element of the motor vehicle, for example a wheel or a disc of a braking element, while a bearing unit has an outer ring, a pair of inner rings, one of which may be the wheel hub itself, and a plurality of rolling bodies, e.g., balls. All these components have an axial symmetry with respect to an axis of rotation of the rotating elements, for example of a wheel hub or of inner rings of a bearing unit or of outer rings of a bearing unit.

Also as a result of ever-increasing global competition, applicant has identified a need for continuous technical or cost-related improvements to wheel hub assemblies. In particular, here applicant has identified a desire for a reduction in losses due to friction of an entire assembly, for any given application and therefore with the same applied loads and the same available volumes. More particularly, a very low friction level is required in order to reduce fuel consumption and $CO_2$ emissions. Overall losses in a transmission system are particularly small. This is especially the case in hybrid type vehicles and in electric vehicles. Reducing losses from friction in a wheel hub assembly then are important in order to increase the autonomy of a vehicle in terms of a number of kilometers that may be traveled using exclusively the battery before having to recharge it or before having to start an internal combustion engine.

Optimizing friction within sealing devices of a bearing unit if one way of reducing losses due to friction. One way of reducing friction, for example, is by reducing a number of contact lips and/or using labyrinth seals. In addition to sealing devices it is also possible to adjust various tribological parameters of a bearing unit, for example, osculation, namely the ratio between the radii of curvature of the raceways and the diameters of the balls, the contact angles (an angle formed by a straight line joining together centers of pressing contact between each raceway and balls and the radial direction of a bearing unit), the number and the diameter of the balls in the ring, and other parameters all have an influence on the amount of frictional forces exchanged between balls and raceways. Optimizing the architecture of a wheel hub assembly may be attempted by adopting a completely asymmetrical designed of the two rows of rolling bodies (typically an inner row and an outer row, though additional rows are possible), using different pitch diameters, diameters of the balls, contact angles, and osculation values.

However, applicant recognizes that optimization of these parameters is not simple because altering at least the aforementioned parameters is a compromise between low frictional resistance and high load capacity and high rigidity. In other words, optimization of frictional resistances penalize the load capacity of a bearing and therefore penalize its working life.

Embodiments of the disclosure provide for a bearing unit of a wheel hub assembly which does not have the aforementioned drawbacks or which at least is able to lessen them a significant degree.

By way of a non-limiting example, various embodiments are described herein with reference to a wheel hub assembly for motor vehicles which is provided with a bearing unit.

With reference to FIG. 1, 10 denotes in its entirety a wheel hub assembly according to embodiments of this disclosure. The figures shows a detail of an example of the configuration.

The wheel hub assembly 10 has a central axis of rotation X and a wheel hub 20 which is, preferably, but not necessarily, rotatable, shown for the sake of simplicity in FIG. 1 as a single element, but according to the present invention comprising at least two elements which are separate and rigidly joined together, a more detailed description thereof being provided below. A wheel hub assembly 10 further comprises a bearing unit 30 in turn has a radially outer ring 31 which is preferably, but not necessarily, stationary; a radially inner ring 20 which is preferably, but not necessarily, rotatable and is defined by the hub 20; a further radially inner ring 34, preferably, but not necessarily mounted rotatable on and integral with the hub 20; two rows of rolling bodies 32, 33, in this example balls, interposed between the radially outer ring 31 and the radially inner rings 20 and 34; and two cages 39, 40 for containing and keeping in position the rolling bodies of the rows of rolling bodies 32, 33.

In the whole of the present description and in the claims, the terms and expressions indicating positions and orientations such as "radial" and "axial" are understood as referring to the central axis of rotation X of a bearing unit 30. Expressions such as "axially external" and "axially internal" instead relate to an assembled condition of the wheel hub assembly and, in the case in question, preferably relate, respectively, to a wheel side and to a side opposite to the wheel side.

A radially outer ring 31 is provided with two radially outer raceways, i.e., a first axially outer raceway 31o and a second axially inner raceway 31i, respectively. The radially inner rings 20, 34 are provided with radially inner raceways, i.e., a first axially outer raceway 20o and a second axially inner raceway 34i, respectively. The raceways allow rolling of the row of axially outer rolling bodies 32 interposed between the radially outer ring 31 and the hub 20, and the row of axially inner rolling bodies 33 between the radially outer ring 31 and the radially inner ring 34. For the sake of simpler graphical illustration the reference numbers 32, 33 will be attributed both to the individual balls and to the rows of balls. Again for the sake of simplicity, the term "ball" may be used by way of example in the present description and in the attached drawings instead of the broader more generic term "rolling body" (and likewise the same reference numbers will be used). For example, cylindrical bodies and tapered bodies rather than balls may be employed.

A wheel hub 20 defines at its axially inner end a flanged edge 24 which is configured to prestress axially an inner ring 34. A wheel hub 20 has, moreover, an axially outer flange portion 25. Such a flange portion has a plurality of axial fixing holes 25'. These holes are the seats for corresponding fixing means (for example stud bolts, not shown in the figures) which connect in a known manner a part of the motor vehicle wheel, for example the non-driving wheel or the brake disc (also known per se and not shown in the figures), to a wheel hub 20. Preferably, a hub 20 has an axially outer cylindrical portion 26 which acts as a centering means for the part of the motor vehicle wheel.

The wheel hub assembly 10 may also be provided with sealing devices 50 for sealing off a bearing unit from the external environment.

Figure 2:
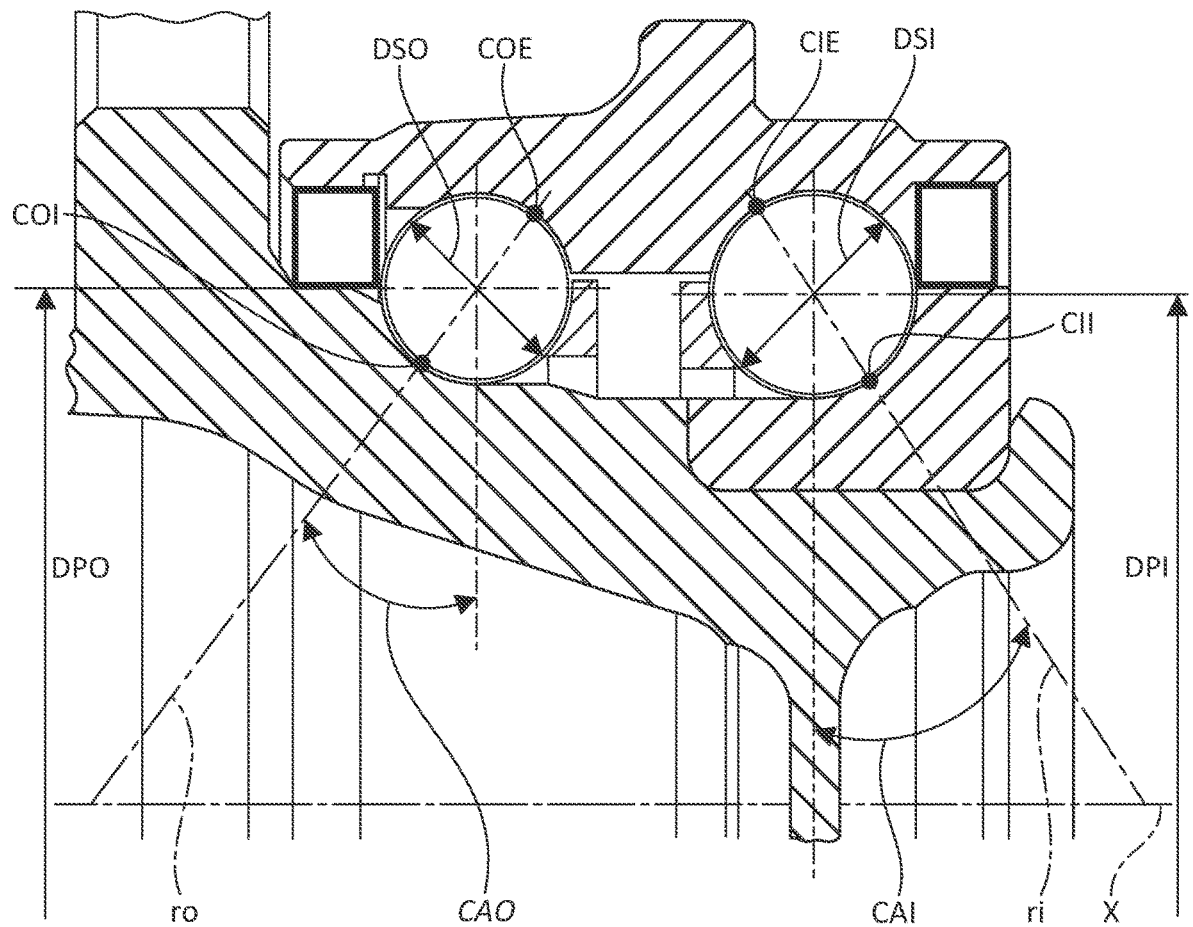
FIG. 2 is a detail, on a larger scale, of the bearing unit according to FIG. 1.

With reference to FIG. 2, certain geometrical parameters considered herein are defined below. Pitch diameter is a diameter of centers of the rolling bodies (referred to as "balls"), considered for the same clearance with both raceways (radially inner and radially outer). The detail in FIG. 2 shows an axially outer pitch diameter DPO and an axially inner pitch diameter DPI. The values of these diameters may also differ from each other.

For a given pitch diameter, the number of balls and the outer diameter of the balls are related to each other. An increase in a number of balls and their diameter decreases and vice versa. FIG. 2 shows the outer diameter (DSO) of balls of axially outer row of balls 32 and the outer diameter (DSI) of balls of axially inner row of balls 33. The values of these diameters may also differ from each other. The reference "NSO" is used to indicate the number of balls in an axially outer row of balls 32 and "NSI" will indicate the number of balls in an axially inner row of balls 33.

"Osculation" is the ratio between the radius of curvature of the raceway and the outer diameter of the balls. "OOE" refers to a ratio between the radius of curvature of a radially outer and axially outer raceway 31o and the outer diameter DSO of the balls in the axially outer row of balls 32. "OIE" refers to a ratio between the radius of curvature of a radially outer and axially inner raceway 31i and an outer diameter DSI of the balls in an axially inner row of balls 33. "OOI" refers to a ratio between a radius of curvature of a radially inner and axially outer raceway 20o and an outer diameter DSO of the balls in an axially outer row of balls 32. "OII" refers to a ratio between a radius of curvature of a radially inner and axially inner raceway 34i and an outer diameter DSI of the balls in an axially inner row of balls 33.

A contact angle is an angle which a straight line ro, ri joining the centers of pressing contact between raceways and balls forms with a radial direction (depicted, e.g., in FIG. 2) of a bearing unit. FIG. 2 shows a contact angle CAO of the balls of an axially outer row of balls 32 and a contact angle CAI of the balls of an axially inner row of balls 33. The values of these angles CAI, CAO for may also differ from each other in various embodiments. Furthermore the points of contact between balls and raceways are indicated, respectively as follows. "COE" refers to a point of contact between a radially outer and axially outer raceway 31o and a ball of an axially outer row of balls 32. "CIE" refers to a point of contact between a radially outer and axially inner raceway 31i and a ball of an axially inner row of balls 33. "COI" refers to a point of contact between a radially inner and axially outer raceway 20o and a ball of an axially outer row of balls 32. "CII" refers to a point of contact between a radially inner and axially inner raceway 34i and a ball of an axially inner row of balls 33.

As mentioned, by adjusting some or all of the geometric parameters (for example increasing the osculations, reducing the contact angles, etc.) it is possible to achieve a significant reduction in the friction losses. But such adjustments often occur to the detriment in overall strength of a wheel hub assembly and will therefore adversely affect its working life.

In embodiments in accordance with this disclosure a double contact angle between rolling bodies and raceways is provided, as will be explained more fully below.

By way of example, attention will be focused on the axial outer and radially inner raceway 20o and on the rolling body 32 of the axially outer row of rolling bodies. All the comments made in connection with these parts will be entirely applicable to other raceways and other rolling bodies.

Figure 3:
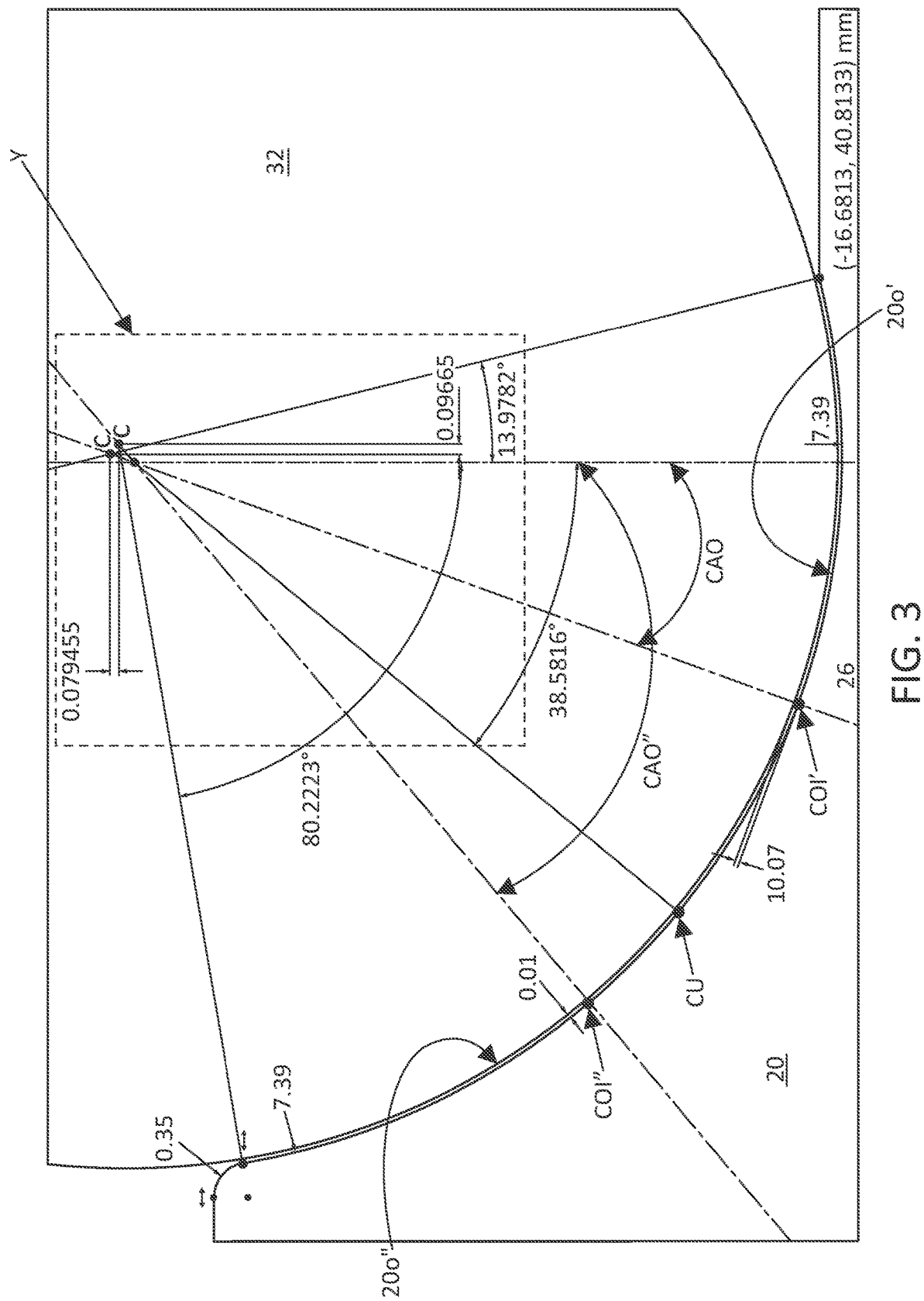
FIG. 3 is a detail, on a further enlarged scale, of a raceway divided into two raceway portions, and of a corresponding rolling body in accordance with this disclosure.

With reference to FIG. 3, a raceway 20o comprises a first raceway portion 20o' and a second raceway portion 20o", both raceway portions being tangential to the rolling bodies at two different contact angles, i.e., a first smaller contact angle CAO' and a second bigger contact angle CAO", respectively. The points of tangential contact between the rolling body 32 and the raceway portions are indicated by COI' and CO1", respectively.

It should be noted that the point of intersection between the two raceway portions is a cusp, e.g., CU, which is created between the two raceway portions. In this way the centers of pressures centers may change depending on driving conditions leading two different contact angles under different conditions.

Figure 4:
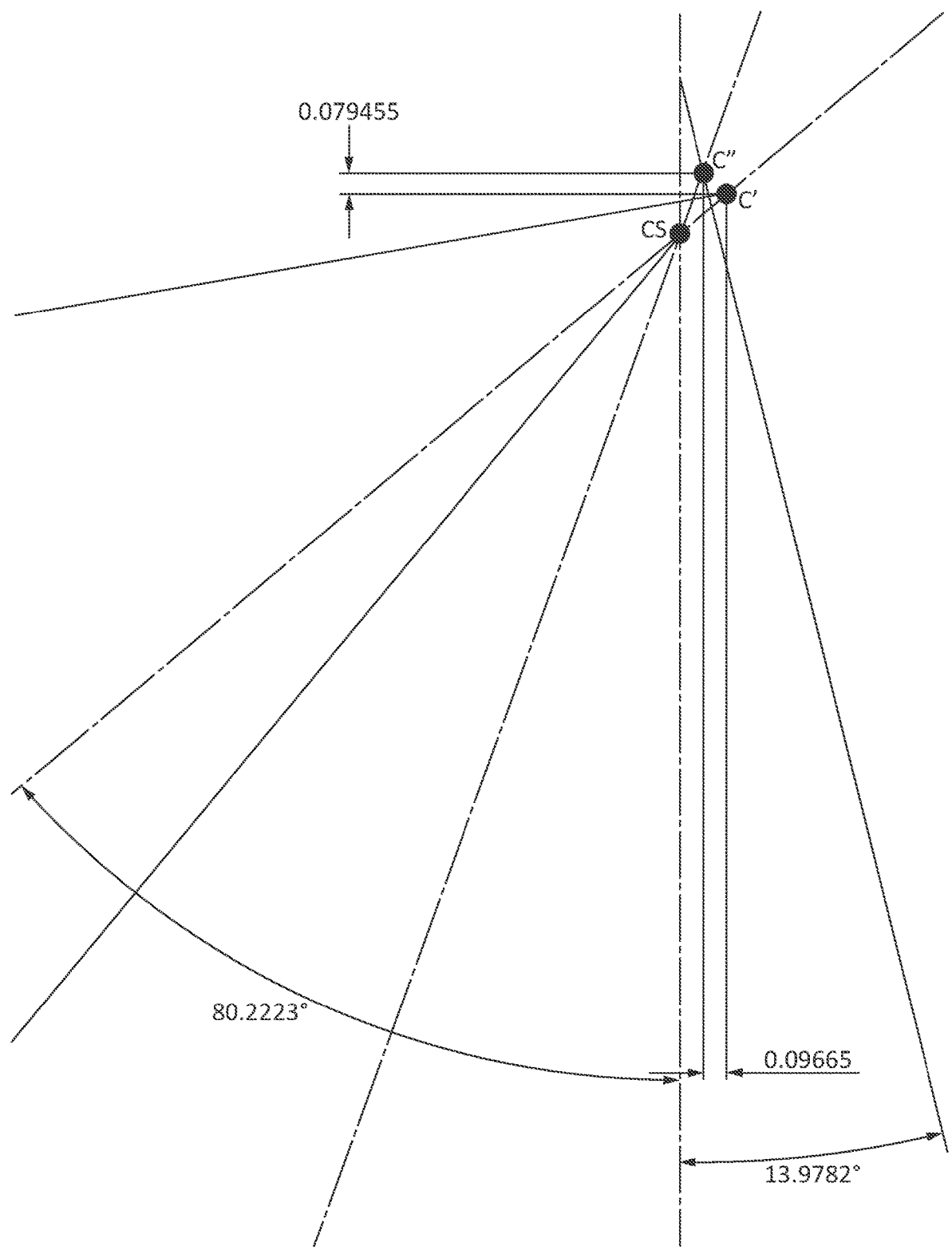
FIG. 4 is a detail, on a yet further enlarged scale, showing the different centers of the two raceways portions.

With reference also to FIG. 4, the two raceway portions 20o' and 20o" will have centers C' and C" which do not coincide with each other or with the center CS of the rolling bodies. Advantageously, both the axial distance and the radial distance between centers of two raceway portions will be contained within a range of between 0.01 mm and 0.5 mm.

In operating conditions characterized by driving along a straight section or around bends with a wide radius of curvature, and therefore in conditions where the external loads are nearly entirely radial or with a very small overturning moment, the rolling bodies normally travel along the first raceway portion 20o', i.e., that with a small contact angle CAO'. Owing to the very small contact angle, with values which may be between 5° and 30°, the friction is very small.

In operating conditions characterized, instead, by bends with a small radius of curvature, i.e., where there are not only radial loads, the rolling bodies will travel along the second raceway portion, i.e., that with a greater contact angle CAO". The high values of this angle, which are typically between 30° and 60°, will ensure the necessary rigidity and wear, depending on the specific requirements.

In order to ensure that, under low load conditions, balls travel only along the first raceway portion, i.e., that with a "smaller" contact angle, the second raceway portion, i.e., that with a "high" contact angle, is designed with an axial clearance, normally within the range of 5µ-20µ; a smaller clearance or no clearance would increase in effect the friction, owing to the greater area of contact between rolling bodies and raceway. A higher clearance (>20µ) would decrease significantly the rigidity of the bearing unit.

Assuming the optimal axial clearance of the raceway with a "high" contact angle of between 4µ and 20µ, again owing to the smaller contact angle, the rigidity of the bearing with low overturning movement is slightly less compared to a standard solution: this lower value, however, may be compensated for by an increase in the preload of the bearing unit, for example a preload of between 25µ and 40µ.

Advantageously, the two raceway portions may each have a different osculation, and therefore a different ratio in relation to the diameter of the rolling body. Therefore OOI'≠OOI", OO1' being the osculation of the first raceway portion and OO1" being the osculation of the second raceway portion. More generally, therefore, the osculation OOI', OOE", OIE', OII' of the first raceway portion 20o', 31o', 31i', 34i' may be different from the osculation OOI", OOE", OIE", OII" of the second raceway portion 20o", 31o", 31i", 34i".

In this way the low friction properties of a first raceway portion could be further improved, adopting therefore different (e.g., higher) osculation values than the standard values equal to 0.5175 for the radially inner raceways and 0.53 for the radially outer raceways. At the same time, the high rigidity and wear properties of the second raceway portion could be further improved, using different (for example smaller) osculation values compared to the standard values of 0.5175 for the radially inner raceways and 0.53 for the radially outer raceways. More generally, it may therefore be the case that the osculation value OOI', OII' of the first radially inner raceway portion 20o', 34i' is different from 0.5175 while the osculation value OOE', OIE' of the first radially outer raceway portion 31o', 31i' is different from 0.53. At the same time, it may be that the value of the osculation OOI", OII" of the second radially inner raceway portion 20o', 34i" is different from 0.5175 and the value of the osculation OOE", OIE" of the second radially outer raceway portion 31o", 31i" is different from 0.53.

Embodiments of this disclosure provide a bearing unit for a wheel hub assembly which has an internal architecture composed of two rows of spherical rolling bodies with four angular contact points, in which at least one raceway (but preferably all four raceways) has basically two contact angles. In particular, the raceway comprises a first raceway portion with a "small" contact angle on which the rolling bodies roll in driving conditions along a straight section or around bends where the bends have a wide radii of curvature. By means of the small contact angle it is possible, therefore, to reduce the friction levels. The raceway further comprises a second raceway portion with a "high" contact angle, along which the rolling bodies travel in driving conditions around bends where the bends have a small radius of curvature, ensuring in these conditions the rigidity and the wear of the bearing unit.

The two raceway portions are therefore both tangential to the corresponding rolling bodies at two different contact angles. The two raceway portions have different centers of curvature with, both an axial offset and a radial offset between them.

Advantageously, the two raceway portions may each have a different osculation (and therefore a different ratio with respect to the ball diameter) so as to improve further the low-friction properties of the first raceway portion, i.e., that with a small contact angle, and the high-rigidity and wear properties of the second raceway portion, i.e., that with a bigger contact angle.

Therefore, embodiments of this disclosure provide a bearing unit for a wheel hub assembly having the characteristics illustrated in the independent claim attached to the present description is provided.

Further preferred and/or particularly advantageous embodiments of the invention are described in accordance with the characteristics indicated in the attached dependent claims.

According to another aspect of the embodiments of this disclosure, a wheel hub assembly which is provided with the bearing unit as defined in the claims attached to the present description is provided.

Basically, with this new design it is possible to obtain a reduction in the friction equal to 20-40% compared to the standard architecture, for the same dimensions and application.

A further reduction in the friction is obtained by providing the bearing unit with a completely asymmetrical design of the two rows of rolling bodies, wherein the different geometric parameters illustrated above may help reduce the friction, adding to the innovative design of the two raceway portions.

In addition to the embodiment described above, it must be understood that there exist numerous other variants. It must also be understood that these embodiments are only examples and do not limit either the scope of the invention, nor its applications, nor its possible configurations. On the contrary, although the description above allows the person skilled in the art to implement various embodiments in accordance with this disclosure, it must be understood that many variants of the components described are possible, without thereby departing from the scope of the invention, as defined in the accompanying claims, interpreted literally and/or in accordance with their legal equivalents.

We claim:

1. A bearing unit for a wheel hub assembly for motor vehicles, the bearing unit having a rotation axis (X) and comprising:
   two radially outer raceways, comprising a first raceway which is a radially outer and axially outer raceway and a second raceway which is a radially outer and axially inner raceway, two radially inner raceways, comprising a third raceway which is a radially inner and axially outer raceway and a fourth raceway which is a radially inner and axially inner raceway, two rows of rolling bodies, comprising an axially outer row and an axially inner row, interposed, respectively, between the first raceway and the third raceway and between the second raceway and the fourth raceway and in axially symmetrical positions relative to a plane of axial symmetry (Z) of the bearing unit, wherein at least one of the raceways comprises a first raceway portion and a second raceway portion, both of the raceway portions being tangential to the rolling body of the row of rolling bodies or to the rolling body of the row of rolling bodies plus an axial clearance at two different contact angles comprising a first contact angle (CAO') and a second contact angle (CAO"), the first contact angle (CAO') of the first raceway portion being smaller than the second contact angle (CAO") of the second raceway portion, wherein the axial clearance of the second raceway portion with respect to the rolling body of the row of rolling bodies comprises a value between 5μ and 20μ.

2. The bearing unit of claim 1, wherein a center (C') of the first raceway portion and a center (C") of the second raceway portion do not coincide.

3. The bearing unit of claim 2, wherein both an axial distance and a radial distance between the center (C') of the first raceway portion and the center (C") of the second raceway portion lie within a range of 0.01 mm to 0.5 mm.

4. The bearing unit of claim 1, wherein the first contact angle (CAO') of the first raceway portion comprises a value between 5° and 30°.

5. The bearing unit of claim 1, wherein the second contact angle (CAO") of the second raceway portion comprises a value between 30° and 60°.

6. The bearing unit of claim 1, wherein an osculation of the first raceway portion is different from an osculation of the second raceway portion.

7. The bearing unit of claim 1, wherein an osculation (OOI', OOE', OIE', OII') of the first raceway portion is different from an osculation (OOI", OOE", OIE", OII") of the second raceway portion, wherein OOI'≠OOI", OOE'≠OOE", OIE'≠OIE", and OII'≠OII";

wherein:
OOI' is a ratio between a radius of curvature of the first raceway portion of the radially inner and axially outer raceway and an outer diameter DSO of the balls in the axially outer row of rolling bodies;

OOI" is a ratio between a radius of curvature of the second raceway portion of the radially inner and axially outer raceway and the outer diameter DSO of the balls in the axially outer row of rolling bodies;

OOE' is ratio between a radius of curvature of the first raceway portion of the radially outer and axially outer raceway and the outer diameter DSO of the balls in the axially outer row of balls;

OOE" is a ratio between a radius of curvature of the second raceway portion of the radially outer and axially outer raceway and the outer diameter DSO of the balls in the axially outer row of balls;

OIE' is a ratio between a radius of curvature of the first raceway portion of the radially outer and axially inner raceway and the outer diameter DSI of the balls in the axially inner row of balls;

OIE" is a ratio between a radius of curvature of the second raceway portion of the radially outer and axially inner raceway and the outer diameter DSI of the balls in the axially inner row of balls;

OII' is a ratio between a radius of curvature of the first raceway portion of the radially inner and axially inner raceway and the outer diameter DSI of the balls in the axially inner row of balls; and OII" is a ratio between a radius of curvature of a second raceway portion of the radially inner and axially inner raceway and the outer diameter DSI of the balls in the axially inner row of balls.

8. The bearing unit of claim 7, wherein the values of the osculation of the first raceway portion of the radially inner and axially outer raceway (OOI') and the first portion of the radially inner and axially inner raceway (OII') are greater than 0.5175, and the values of the osculation of the first raceway portion of the radially outer and axially outer raceway (OOE') and first raceway portion of the radially outer and axially inner raceway (OIE') is greater than 0.53.

9. The bearing unit of claim 7, wherein the values of the osculation of the second raceway portion of the radially inner and axially outer raceway (OOI") and the second portion of the radially inner and axially inner raceway (OII") is less than 0.5175 and the values of the osculation of the second raceway portion of the radially outer and axially outer raceway (OOE") and the second raceway portion of the radially outer and axially inner raceway (OIE") is less than 0.53.

10. A wheel hub assembly for motor vehicles, the assembly comprising:
a wheel hub; and
a bearing unit having a rotation axis (X) and comprising:
two radially outer raceways, comprising a first raceway which is a radially outer and axially outer raceway and a second raceway which is a radially outer and axially inner raceway, two radially inner raceways, comprising a third raceway which is a radially inner and axially outer raceway and a fourth raceway which is a radially inner and axially inner raceway, wherein at least one of the two radially inner raceways is formed on the wheel hub, two rows of rolling bodies, comprising an axially outer row and an axially inner row, interposed, respectively, between the first raceway and the third raceway and between the second raceway and the fourth raceway and in axially symmetrical positions relative to a plane of axial symmetry (Z) of the bearing unit, wherein at least one of the raceways comprises a first raceway portion and a second raceway portion, both of the raceway portions being tangential to the rolling body of the row of rolling bodies or to the rolling body of the row of rolling bodies plus an axial clearance at two different contact angles comprising a first contact angle (CAO') and a second contact angle (CAO"), the first contact angle (CAO') of the first raceway portion being smaller than the second contact angle (CAO") of the second raceway portion, wherein the axial clearance of the second raceway portion with respect to the rolling body of the row of rolling bodies comprises a value between 5μ and 20μ.

11. The wheel hub assembly of claim 10, wherein a center (C') of the first raceway portion and a center (C") of the second raceway portion do not coincide.

12. The wheel hub assembly of claim 11, wherein both an axial distance and a radial distance between the center (C') of the first raceway portion and the center (C") of the second raceway portion lie within a range of 0.01 mm to 0.5 mm.

13. The wheel hub assembly claim 10, wherein the first contact angle (CAO') of the first raceway portion comprises a value between 5° and 30°.

14. The wheel hub assembly of claim 10, wherein the second contact angle (CAO") of the second raceway portion comprises a value between 30° and 60°.

15. The wheel hub assembly of claim 10, wherein an osculation of the first raceway portion is different from an osculation of the second raceway portion.

16. The wheel hub assembly of claim 10, wherein an osculation (OOI', OOE', OIE', OII') of the first raceway portion is different from an osculation (OOI", OOE", OIE", OII") of the second raceway portion, wherein OOI'≠OOI", OOE'≠OOE", OIE'≠OIE", and OII'≠OII";

wherein:
OOI' is a ratio between a radius of curvature of the first raceway portion of the radially inner and axially outer raceway and an outer diameter DSO of the balls in the axially outer row of rolling bodies;
OOI" is a ratio between a radius of curvature of the second raceway portion of the radially inner and axially outer raceway and the outer diameter DSO of the balls in the axially outer row of rolling bodies;
OOE' is ratio between a radius of curvature of the first raceway portion of the radially outer and axially outer raceway and the outer diameter DSO of the balls in the axially outer row of balls;
OOE" is a ratio between a radius of curvature of the second raceway portion of the radially outer and axially outer raceway and the outer diameter DSO of the balls in the axially outer row of balls;
OIE' is a ratio between a radius of curvature of the first raceway portion of the radially outer and axially inner raceway and the outer diameter DSI of the balls in the axially inner row of balls;
OIE" is a ratio between a radius of curvature of the second raceway portion of the radially outer and axially inner raceway and the outer diameter DSI of the balls in the axially inner row of balls;
OII' is a ratio between a radius of curvature of the first raceway portion of the radially inner and axially inner raceway and the outer diameter DSI of the balls in the axially inner row of balls; and
OII" is a ratio between a radius of curvature of a second raceway portion of the radially inner and axially inner raceway and the outer diameter DSI of the balls in the axially inner row of balls.

17. The wheel hub assembly of claim 16, wherein the values of the osculation of the first raceway portion of the radially inner and axially outer raceway (OOI') and the first portion of the radially inner and axially inner raceway (OII') are greater than 0.5175, and the values of the osculation of the first raceway portion of the radially outer and axially outer raceway (OOE') and first raceway portion of the radially outer and axially inner raceway (OIE') is greater than 0.53.

18. The wheel hub assembly of claim 16, wherein the values of the osculation of the second raceway portion of the radially inner and axially outer raceway (OOI") and the second portion of the radially inner and axially inner raceway (OII") is less than 0.5175 and the values of the osculation of the second raceway portion of the radially outer and axially outer raceway (OOE") and the second raceway portion of the radially outer and axially inner raceway (OIE") is less than 0.53.

* * * * *